Oct. 1, 1940.  W. L. KAUFFMAN, 2D  2,216,391
WRINGER
Filed July 6, 1937   2 Sheets-Sheet 1

Walter L. Kauffman II
INVENTOR.

BY
ATTORNEYS.

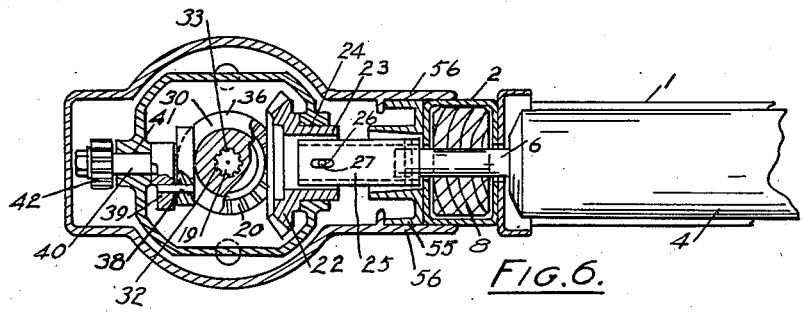

Patented Oct. 1, 1940

2,216,391

UNITED STATES PATENT OFFICE 2,216,391

WRINGER

Walter L. Kauffman, II, Erie, Pa.

Application July 6, 1937, Serial No. 152,097

10 Claims. (Cl. 68—269)

This invention is designed to provide a means whereby, by the mere movement of the wringer itself, the driving connection of the gears is changed either to bring it to neutral or to reverse. It will be understood that when an operator gets a hand in a power wringer such operator instantaneously pulls on the hand that is caught in an effort to extract it. In the present device this pull swings the wringer and reverses the roll so as to roll the hand out of the wringer. One of the features of the invention is to accomplish this operation without being resisted by the torque thrusts of the wringer so that the necessary effort to swing the wringer may be independently controlled and thus give the wringer just the necessary stability for normal use. Features and details of the invention will appear from the specification and claims.

A preferred embodiment of the invention is illustrated in the accompanying drawings as follows.

Figure 1:
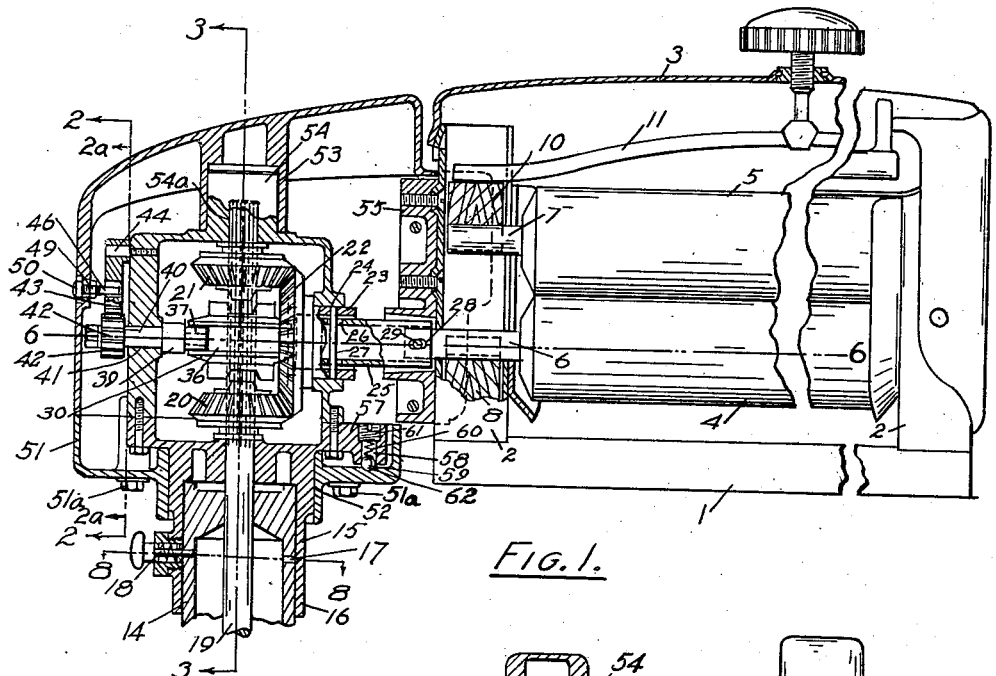
Fig. 1 shows an elevation of a wringer and driving mechanism, parts, particularly the driving mechanism, being in section.
Figure 2:
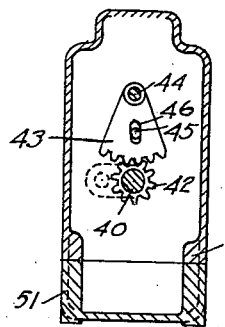
Fig. 2 shows a section on the line 2—2 in Fig. 1.
Figures 2A, 5:
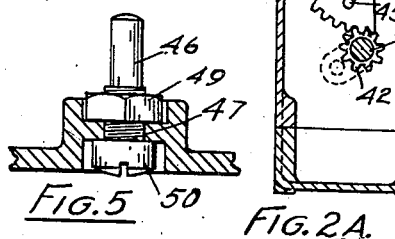

Fig. 2a a section on the line 2a—2a in Fig. 1.

Figures 3, 4:
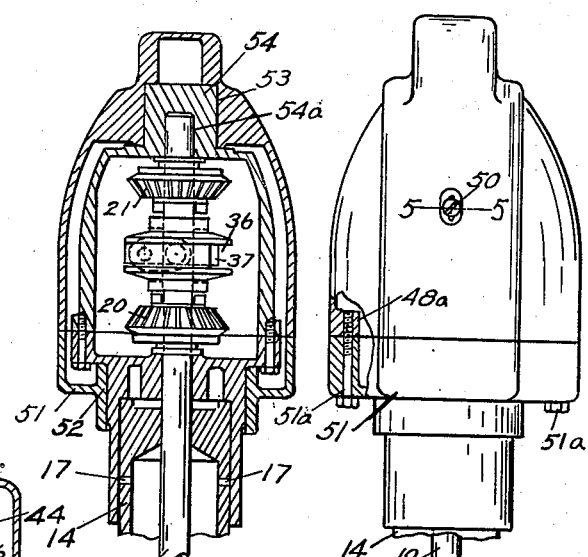

Fig. 3 a section on the line 3—3 in Fig. 1.

Fig. 4 an end view of the wringer.

Fig. 5 a section on the line 5—5 in Fig. 4.

Fig. 6 a section on the line 6—6 in Fig. 1, with the parts in operative position.

Fig. 7 a similar view with the parts in release position.

Fig. 8 a section on the line 8—8 in Fig. 1.

Fig. 9 a plan view showing positioning detents for locking the wringer in adjusted position.

The wringer frame is made up of a base 1, side stiles 2, and a top bar 3. The wringer has lower and upper rolls 4 and 5 respectively and these rolls are supplied with shafts 6 and 7 respectively. The lower shaft 6 is journalled in bearings 8 fixed in the side stiles. The upper shaft 7 is journaled in bearings 10 slidingly mounted in the side stiles. A spring 11 operates on the upper bearings to exert pressure on the rolls. It is adjusted in the usual manner by screw 12 operating through a nut in the top bar. The top bar may be detachable from the side stiles in any common manner for release purposes if desired, but this particular feature is not involved in the present invention and the parts so far as described may be of any of the common forms of wringer.

A post 14 carries the wringer. A gear frame or head 15 has a sleeve 16 rotatively mounted on the upper end of the post. The head may be adjusted on the post and locked in adjustment in the usual manner, namely, the radial openings 17 in the post and a spring latch 18 in the head which extends into the socket 17. There are four of the sockets so that the wringer may be swung to four different positions, as desired. A drive shaft 19 extends through the post. A beveled gear 20 is journaled on this shaft and a second beveled gear 21 is also journaled on this shaft. The gears 20 and 21 mesh with a common gear 22. The gear 22 has a bearing sleeve 23 extending from its hub which operates in a bearing 24 in the head 15.

A flexible coupling is arranged between the shaft 6 and the sleeve 23 as follows: A tube 25 extends into the sleeve 23. The tube is provided with slots 26 and a pin 27 extends through these slots and into openings in the sleeve. The tube 25 is slotted at 28 and a pin 29 extends through this slot and is fixed in the shaft 6, the openings in the tube 25 being at right angles to the slots 26 in that tube. This permits the wringer to be swung to the positions shown in Fig. 7 in which positions the gears are released or reversed.

A clutch sleeve 30 is connected with the shaft 19 by splines and grooves 32 and 33 and is, therefore, free to slide on the shaft vertically, but is locked against rotation with respect to the same. This sleeve has clutch notches 34 at its ends which engage projections 35 on the gears 20 and 21, these notches and projections forming what is commonly called jaw or detent clutches. The reverse sleeve 30 has an annular groove 36 arranged in it. A sliding block 37 operates in this groove. A crank pin 38 locks the sliding block 37 with a crank 39. The crank 39 is provided with a shaft 40. The shaft 40 is journaled in a bearing 41 in the frame or head 15. A gear 42 is fixed on the outer end of the shaft 40 and meshes with a segmental gear 43. The segmental gear is pivotally mounted on a pin 44 extending from the frame 15. The gear has a slot 45 through which a pin 46 extends. The pin 46 extends through an opening 47 in a shell or case 48. The pin 46 is screw-threaded and a nut 49 is arranged on the inner side of the shell and operates with a head 50 of the screw to clamp the pin in the wall. (See Fig. 5.)

The case has a bottom section 51 which is provided with a ring 52 forming a bearing on the sleeve 16. This lower section is secured to the upper section by screws 51a which extend upwardly through the bottom section into bosses 48a in the upper section. The upper part of the case has a socket 53 which is journaled on a projection 54 in the upper part of the frame. The boss 54 contains a bearing socket 54a for the upper end of the shaft 19. A mounting plate 55 is secured to the stile, and the case 48 has extensions 56 which are secured to the mounting plate 55. Thus it will be seen that the wringer is mounted on the case and that the case is journaled on the head and that the head is adjustable on the post.

The normal position of the wringer is away from the operator as indicated in dash lines in Fig. 7. This engages the gears for a forward rotation of the rolls away from the operator. If the operator becomes caught, the operator pulls the wringer toward her, carrying the wringer to a neutral position at the center, and if the pull is continued, to the reverse position shown in Fig. 7. It will be understood that the wringer may be swung in either direction and that the wringer rolls will be rotating in a forward direction for the operator, positioned with relation to the wringer, with the wringer swung away from the operator.

While I have shown this mechanism to operate with the pulling of the wringer toward the operator, it will be understood that this may be readily shifted so that the normal position may be toward the operator and the release accomplished by a push of the wringer away from the operator. This would be accomplished by a mere reversal of the segment 43 from a position above the gear 42 to a position below it.

In order that the wringer may be retained so as to satisfy normal requirements in the set position I provide a yielding detent mechanism between the case or shell and the frame. For this purpose an arm 57 extends toward the wringer from the frame. This arm is provided with an opening 58 in which is provided a ball 59. A spring 60 urges the ball downwardly and a screw 61 holds the spring in the opening. The ball operates upon detents 62, three of such detents being provided, one for the neutral position, and one for each set position.

What I claim as new is:

1. In a wringer having a wringer frame, a pair of wringer rolls mounted in the frame, a gear head, a reversing gearing mounted in the head, and a driving connection between the gearing and one of the rolls; the combination with the frame, rolls, head, reversing gearing and driving connection of a connection between the frame and the head supporting the frame from the head, said connection yielding to permit movement of the frame and with it both rolls relatively to the head, said connection comprising devices maintaining the axes of the rolls in vertical planes; and means operatively associated with the reverse gearing comprising a crank responsive to said yielding movement of the frame reversing the driving direction of the gearing.

2. In a wringer having a wringer frame, a pair of wringer rolls mounted in the frame, a gear head, a reversing gearing mounted in the head comprising oppositely faced beveled gears meshing a common gear, a clutch block between the opposing gears, and a crank operating the clutch block; the combination with the frame, rolls, head, reversing gearing of a connection between the frame and the head supporting the frame from the head, said connection yielding to permit movement of the frame and with it both rolls relatively to the head; and means operatively associated with the crank and responsive to said yielding movement of the frame actuating the crank to reverse the driving direction of the gearing.

3. In a wringer having a wringer frame, a pair of wringer rolls mounted in the frame, a supporting post, and means mounted on the post for driving the rolls comprising devices reversing the rolls; the combination with the frame, rolls, post and means of a pivotal connection between the post and the driving end of the frame having a vertical axis and yielding to permit forward and back movement of the frame and with it both rolls, said connection comprising devices maintaining the axes of the rolls in vertical planes; and means operatively associated with the driving means and responsive to pivotal movement of the frame reversing the driving direction of the driving means.

4. In a wringer having a wringer frame, a pair of wringer rolls mounted in the frame, and means for driving the rolls comprising devices reversing the rolls; the combination with the frame, rolls and means of a mounting for the frame supporting the frame at the driving end of the frame comprising devices maintaining the axes of the rolls in vertical planes, said second devices yielding to permit movement of the frame and with it both rolls, the point of support of the frame by the mounting being offset endwise from the ends of the rolls whereby the entire length of the rolls when moved yield in the same direction; and means operatively associated with the driving means and responsive to said yielding movement of the frame reversing the driving direction of the driving means.

5. In a wringer having a wringer frame, a pair of wringer rolls mounted in the frame, and means for driving the rolls comprising devices reversing the rolls; the combination with the frame, rolls and means of a mounting for the frame supporting the frame at the driving end of the frame and yielding to permit forward or back movement of the frame and with it both rolls, said mounting comprising devices maintaining the axes of the rolls in vertical planes, the point of support of the frame by the mounting being offset endwise from the ends of the rolls whereby the entire length of the rolls when moved yield in the same direction; and means operatively associated with the driving means and responsive to said yielding movement of the frame reversing the driving direction of the driving means.

6. In a wringer having a wringer frame, a pair of wringer rolls mounted in the frame, a gear head, a reversing gearing mounted in the head, and a driving connection between the gearing and one of the rolls; the combination with the frame, rolls, head, reversing gearing and driving connection of a connection between the driving end of the frame and the head supporting the frame from the head, said connection yielding to permit movement of the frame and with it both rolls relatively to the head, said connection comprising devices maintaining the axes of the rolls in vertical planes, the point of support of the frame by the mounting being offset endwise from the ends of the rolls whereby the entire length of the rolls when moved yield in the same direction; and means operatively associated with the reverse gearing to said yielding movement of the frame reversing the driving direction of the gearing.

7. In a wringer having a wringer frame, a pair of wringer rolls mounted in the frame, a gear head, a reversing gearing mounted in the head, and a driving connection between the gearing and one of the rolls; the combination with the frame, rolls, head, reversing gearing and driving connection of a connection between the driving end of the frame and the head supporting the frame from the head, said connection yielding to permit forward or back movement of the frame and with it both rolls relatively to the head, said connection comprising devices maintaining the axes of the rolls in vertical planes, the point of support of the frame by the mounting being offset endwise from the ends of the rolls whereby the entire length of the rolls when moved yield in the same direction; and means operatively associated with the reverse gearing responsive to said yielding movement of the frame reversing the driving direction of the gearing.

8. In a wringer having a wringer frame, a pair of wringer rolls mounted in the frame, a gear head, a reversing gearing mounted in the head, and a driving flexible connection between the gearing and one of the rolls; the combination with the frame, rolls, head, reversing gearing and flexible connection of a connection between the driving end of the frame and the head supporting the frame from the head, said connection yielding to permit movement of the frame and with it both rolls relatively to the head, said connection comprising devices maintaining the axes of the rolls in vertical planes, the point of support of the frame by the mounting being offset endwise from the ends of the rolls whereby the entire length of the rolls when moved yield in the same direction; and means operatively associated with the reverse gearing responsive to said yielding movement of the frame reversing the driving direction of the gearing.

9. In a wringer having a wringer frame, a pair of wringer rolls mounted in the frame, and means for driving the rolls comprising devices reversing the rolls; the combination with the frame, rolls and means of a mounting for the frame supporting the frame at the driving end of the frame and yielding to permit movement of the frame and with it both rolls, said mounting including devices maintaining the axes of the rolls in vertical planes, the point of support of the frame by the mounting being offset endwise from the ends of the rolls whereby the entire length of the rolls when moved yield in the same direction; yielding retaining devices yieldingly holding the wringer frame against movement; and means operatively associated with the driving means and responsive to said yielding movement of the frame reversing the driving direction of the driving means.

10. In a wringer having a wringer frame, a pair of wringer rolls mounted in the frame, a gear head, a reversing gearing mounted in the head, and a driving connection between the gearing and one of the rolls; the combination with the frame, rolls, head, gearing and driving connection of a connection between the driving end of the frame and the head supporting the frame from the head, said connection yielding to permit movement of the frame and with it both rolls relatively to the head, the point of support of the frame by the mounting being offset endwise from the ends of the rolls whereby the entire length of the rolls when moved yield in the same direction, the driving relation of the members in the gearing and the supporting connection of the frame relieving the frame from torque thrust in the direction of the yielding movement of the frame; and means operatively associated with the reverse gearing responsive to said yielding movement of the frame reversing the driving direction of the gearing.

WALTER L. KAUFFMAN, II.